United States Patent Office 3,816,552
Patented June 11, 1974

3,816,552
PROCESS FOR THE PREPARATION OF
PERFLUORINATED COMPOUNDS
Robert Hartwimmer, Burghausen (Salzach), Germany, assignor to Farbwerke Hoechst Aktiengesellschaft vormals Meister Lucius & Bruning, Frankfurt am Main, Germany
No Drawing. Filed June 22, 1971, Ser. No. 155,649
Claims priority, application Germany, June 24, 1970,
P 20 31 047.8
Int. Cl. C07c 17/24, 23/00
U.S. Cl. 260—648 F 11 Claims

ABSTRACT OF THE DISCLOSURE

The present invention relates to a process for the preparation of cyclic perfluoro-olefins and certain derivatives by pyrolysis degradation of perfluorocarbon compounds and fluorocarbon waxes of mean and high molecular weight at temperatures of from 500° to 1000° C. and pressures of from 50 to 300 atm./g. The cyclic perfluoro-olefins are suitable compounds for example for intermediate products and for co-monomers.

---

The present invention relates to a process for the preparation of cyclic perfluoro-olefins having a 4 to 6-member ring, and of the perfluoro-alkyl substituted derivatives thereof by thermic cracking of perfluorocarbon compounds and fluorocarbon waxes.

In the description of U.S. Pat. No. 2,496,978, of German Pat. No. 1,049,099 and of British Pat. No. 1,074,768 it has been proposed to control the thermic cracking of poly- tetra-fluorethylene by choosing corresponding experimental conditions so as to obtain either wax-like cracking products of low molecular weight or also, nearly quantitatively, monomer tetrafluoroethylene (see also Madorsky et al.: J. Res. NBS, 51/327–333; R. E. Florin et al.: J. Res. NBS, 55/121; L. A. Wall et al.: J. Res. NBS, 56/27; J. C. Siegle et al.: J. Polymer Sci., vol. 2/391–404 (1964); U.S. Pat. No. 2,406,153).

Furthermore, it has already been proposed to control the above pyrolysis reaction so as to obtain mainly perfluoropropene (see U.S. Pats. Nos. 2,759, 983 and 2,970,-176) or octafluoro-cyclobutane as well as other cyclic perfluoroalkanes of low molecular weight corresponding to the general formula $C_nF_{2n}$ (see U.S. Pat. No. 2,394,-581, p. 2, from column 1, lines 67–75 to column 2, lines 1–7).

In the above-mentioned degradation reactions, perfluorated cyclic olefins of the formula $C_nF_{2n-2}$ are practically not obtained or only in insignificant amounts. However, the preparation of these unsaturated perfluorated compounds was desirable due to the reactivity and the wide application range of these substances.

Subject of the present invention is therefore a process for the preparation of cyclic perfluoro-olefins having a 4 to 6-member ring and of the perfluoro-alkyl substituted derivatives thereof corresponding to the general formula $$C_nF_{2n-2},$$

in which $n$ represents an integer of from about 4 to 12, preferably of from 5 to 8, by thermic cracking of perfluorocarbon compounds and fluorocarbon waxes of mean to high molecular weight, at elevated temperatures and under increased pressure, wherein the pyrolysis is carried out at temperatures of from 500° to 1000° C. and under partial pressures of the degradation products of from 50 to 300 atm./g., preferably of from 70 to 200 atm./g., optionally in the presence of catalysts and inert gases, and the reaction products so obtained are subsequently separated by distillation.

These very reactive compounds, until now scarcely known, which could be obtained only with poor yields from very expensive starting substances, very often only by multiple-step syntheses, according to the process of the invention now can be easily prepared with good yields. In view of the state of the art as described initially, it was a surprising fact that the cited perfluorated cyclic olefins of the general formula $C_nF_{2n-2}$ can be advantageously obtained by the pyrolysis reaction according to the present invention.

Compounds of the nature as indicated, obtainable by the pyrolysis reaction according to the present invention, are for example mainly octafluoro-cyclopentene and its derivatives substituted by one or more perfluoro-alkyl groups, for example heptafluoro-1-trifluoro-methyl-cyclopentene-(1) or hexafluoro-bis[trifluoro-methyl]-cyclopentene. Furthermore, heptafluoro-1-pentafluoro-ethyl-cyclopentene-(1) and heptafluoro-1-heptafluoro-propyl-cyclopentene-(1) should be mentioned. Other componnds of this type are decafluoro-cyclohexene and the derivatives thereof, for example nonafluoro-1-trifluoromethylcyclohexene-(1), nonafluoro-1-pentafluoro-ethyl - cyclohexene-(1) and other derivatives of this 6-membered isocycle substituted by one or more substituents.

There should also be cited perfluorated compound derived from cyclobutene and having perfluorated side chains, for example pentafluoro-1-trifluoromethyl-cyclobutene-(1) or pentafluoro-1-pentafluoroethyl-cyclobutene-(1).

The pyrolysis reaction of the present invention may be carried out within a wide range of temperatures, practically between 500° and 1000° C., preferably between 600° and 900° C. However in order to avoid a too long reaction time on the one hand and on the other the formation of too much undesirable by-products of low molecular weight, such as tetrafluorethylene, hexafluoropropylene and octafluoro-cyclobutene, it is advantageous to carry out the pyrolysis at temperatures of from 600° to 700° C. In this temperature range, also optimum yields of the desired products are obtained.

The heating time varies in accordance with each special case, since it depends on numerous factors, for example capacity and material of the vessel, the kind of isolation, the quantities fed in and, above all, the number and the effect of the heating elements.

The reaction time necessary for the pressure required according to the present invention to be built up on the basis of the predetermined temperature from the partial pressures of the pyrolysis products formed progressively and from the partial pressure of the also included amount of air or nitrogen varies from a few minutes to several hours and is essentially fixed already by the pre-determined temperature.

An economically acceptable reaction time in the temperature range of from 600° to 900° C. ranges from 0.5 to 5 hours. The advantageous pyrolysis time for the preferable temperature range of from 600° to 700° C. is from 1 to 5 hours, preferably from 1 to 3 hours.

In principle, it is also possible to prepare the compounds of the invention at temperatures below 500° C. if a sufficient pyrolysis time is chosen. However, such a process would be of no advantage as to its profitability. The same goes for too high pyrolysis temperatures which do not bring about substantial advantages by possible saving of time and which, by the way, would result in decreased yields on account of the relatively long heating or cooling periods.

For carrying out the pyrolysis, pressure vessels of any design may be used, for example high pressure stationary autoclaves, shaking autoclaves, bomb tubes, as well as other conventional pressure vessels, but also apparatuses specially adapted to the requirements of the process of the invention. A stirring device is not specially required. Also suitable continuously operating apparatuses having special inlet and outlet devices may be used.

As material for these apparatuses, high temperature resistant steels and metals showing a high corrosion resistance should be used, for example V 4A, nickel, Hastelloy®, Tinidur K® etc. Only the normal measuring and indicator devices serving for the control of the course of the pressure and the temperature are required. An automation or, better, a programming of the temperature course is recommended.

After the pressure vessel filled as compactly as possible with the high molecular weight perfluorocarbon compounds and fluorocarbon waxes has been flushed with nitrogen or another inert gas, it is tightly closed and the heating is started. With the temperature rising and the time accumulating, i.e. with increasing cracking, a total pressure is building up from the partial pressure of the inert gas used for flushing and from the partial pressures of the degradation products formed. The partial pressure of the degradation products is in a direct relation to the degradation degree of the starting material existing at the very moment; thus a control of the pyrolysis in accordance with the course of the pressure is possible. The process of the present invention may therefore, within certain limits, be adapted at its optimum to the one or the other group of substances which can be prepared according to the present invention. Also by the period of the temperature effect, i.e. the dwelling time of the substances in the pyrolysis vessel, the composition of the crude pyrolysis product can be influenced to a certain extent.

In a modification of the process of the invention, it is possible to predetermine a distinct pressure in the reaction vessel before the beginning of the pyrolysis by means of an inert foreign gas or a gas similar in nature with respect to the gaseous degradation products, for example nitrogen, argon or tetrafluorethylene, tetrafluoroethane, tetrafluoromethane, etc.

Suitable starting substances for the preparation of the cyclic carbon fluoride olefins according to the pyrolysis process of the present invention generally are all perfluorocarbon compounds and fluorocarbon waxes of mean or high molecular weight, advantageously those having a molecular weight of from 500 to about 6 million, especially of from 5000 to 5 million. However, also perfluorocarbon compounds and fluorocarbon waxes having lower or higher molecular weights than cited above may be used for the pyrolysis reaction of the invention.

For economic reasons, especially those products should be used which are easily obtained in simple syntheses proceeding without difficulty or such products as are currently used in industrial practice on account of their special properties and capabilities and therefore manufactured on a large scale. Such products are above all the known fluorine plastics, for example polytetrafluoroethylene and copolymers of tetrafluorethylene and hexafluoropropene as well as copolymers of tetrafluorethylene and other fluoro-olefins of every kind and nature. To this series furthermore belong all kinds of high molecular weight degradation products of these plastics, i.e. all fluorocarbon waxes, those of low melting point (from 60° to 250° C.) as well as those called sublimation waxes (melting point from 250° to 300° C.) and the high viscosity waxes having melting points above 300° C. Suitable substances are furthermore certain mean and high molecular weight telomerisates of tetrafluorethylene and/or other fluoro-olefins.

Not only pure polytetrafluoroethylene and the copolymers thereof may be used as starting material according to the process of the present invention, but also all waste products occurring during the production or processing of these plastics which generally do not find a useful application may advantageously serve for the purposes of the invention. Thus, for example, all spoiled batches and/or smudged product parts, sieve or work-up residues of the production, all scraps and swarfs of machining and extruding plants for polytetrafluorethylene, as well as defective shaped articles from moulding and sintering processes may be used as starting material for the preparation of these valuable reactive compounds.

Generally, no further additives are added to the material to be subjected to pyrolysis. However, it has been found that small amounts, for example of from 0.01 to 5% by weight, preferably from 0.1 to 1% by weight, of certain catalysts substantially accelerate the degradation of the high molecular weight fluorocarbon compounds, thus resulting in a considerably shortened pyrolysis time, decreased pyrolysis temperatures or increased formation of the liquid portions.

The following catalysts are advantageously used: nitric oxides, especially NO, $NO_2$ or mixtures thereof, sulfur oxides, especially $SO_2$, nitrosyl, thionyl, sulfuryl and nitroso compounds, especially fluorides and chlorides. Furthermore, also those substances may be used for the indicated purpose which, under the pyrolysis conditions cited, set free the above mentioned compounds.

In order to terminate the pyrolysis, the heating devices are switched off after the necessary reaction time has passed. In the case where the relatively low boiling by-products of the pyrolysis are to be abandoned, the vessel and its content are allowed to cool down, if necessary with blast cooling. Thus the pressure in the reaction vessel decreases to a few atmospheres; the pressure of the vessel is then slowly released and the by-products being in a gaseous state at room temperature are allowed to escape over the roof. Subsequently, the liquid content of the vessel containing the desired perfluorated cyclo-olefins in an already pre-concentrated form is let off through a bottom valve into a pre-cooled distilling flask, or the liquid portion of the product is pressed through a rising pipe into the pre-cooled distilling vessel by means of $N_2$. In the case where also the valuable by-products shall be used, it is preferable to release the pressure of the vessel already at a relatively high temperature, for example within the range of from 150° to 200° C., and then to condensate the total of the volatile degradation products in a subsequent multiple-step cooling system.

As by all thermic cracking processes, naturally also by this reaction a considerable number of by-products is obtained. Most of them are obtained in relatively small amounts, some of them, however, are obtained in amounts the isolation and further use of which proves to be paying. Isolation and preparation of the pure perfluoro-cyclo-olefins and separation of the by-products of the reaction from the crude mixtures obtained by the above mentioned method can be carried out according to one of the known separation methods used in chemical engineering. In the case of smaller amounts of substance, their separation may be carried out very easily by means of preparative gas chromatography; for the separation of laboratory scale substance amounts low temperature distillation may be advantageously used while in the case of larger amounts pressure distillation should be chosen as separation technique.

The liquid crude pyrolysis product obtained contains the perfluorated cyclo-olefins of the formula $C_nF_{2n-2}$ according to the present invention, but also some compounds from the series of the $C_2F_{2n+2}$ perfluoro-alkanes and, furthermore, noncyclic perfluoro-olefins of the formula $C_nF_{2n}$, partially those having a branched structure, partially those having a double bond in central position. As is known, perfluorated alkanes are valuable refrigerating agents and dielectrics for electric and electronic installations, good solvents and excellent reaction media. The aliphatic perfluoro-olefins in central position or branched may be oxidized according to known methods to form corresponding perfluorated acids or ketones, or processed to obtain fire extinguishers, solvents and versatile intermediate products by addition of other compounds.

Since the pyrolysis is carried out in a closed system, there are nearly no losses of substance. The depolymerisation degree is >95%. A decomposition with separation of carbon, such as described in British Pat. No. 1,047,768, cannot be observed at all. The degradation products in nearly all cases are compounds having from 2 to 20 carbon atoms in the molecule. The perfluorated cyclo-olefins contained in the total pyrolysis product amount to 25 to 35%, and those obtained in the crude products let off at normal temperature amount to 40 to 50% of the total liquid. In the case where the optimum time, temperature and pressure conditions are very exactly determined, even higher yields can be expected. Apart from the cycloolefins, the following substances are obtained in amounts worth mentioning: perfluoro-propylene and perfluoro-isobutylene as unsaturated compounds of the formula $C_nF_{2n}$, and $C_5F_{12}$ and $C_6F_{14}$ as proportionally most important substances of the series of saturated $C_nF_{2n+2}$ perfluoro-alkanes. From time to time, some starting material cracked not at all or only to the waxen state remains in the pyrolysis vessel which, immediately or later, may be used again for a new batch.

As already mentioned above, the perfluorated cyclic olefins of the general formula $C_nF_{2n-2}$, obtained by the pyrolysis degradation according to the present invention in the first place—in comparison with the substances of the other series of compounds—generally are very reactive and may be used for various reactions even under gentle conditions. They are therefore versatile intermediate products for the synthesis of pharmaceutical compositions and plant protection agents as well as for the synthesis of oil- and water-repellent textile finishing products. They may be oxidized already under normal conditions and are therefore starting materials for the preparation of perfluorated ketocarboxylic acids and perfluorated dicarboxylic acids. Some of the compounds obtained according to the process of the present invention may also be used as co-monomers and the like for the preparation of new copolymers.

The following examples illustrate the invention.

EXAMPLE 1

As reaction vessel, a pressure tube made from V 4A steel, having a length of 850 mm., an inside diameter of 30 mm. and a capacity of 600 ml. is used. The tube is filled up with 350 g. of polytetrafluorethylene material in the form of scales and chips as they are obtained for example by a mechanical crushing of the scraps of a PTFE semi-finished goods manufacturing plant. The ends of the tube are screwed up by plugs equipped with a manometer (from 0 to 300 atm./g.) and a valve. The air in the vessel is driven out with $N_2$ through both the opened valves. One of the valves is then closed, and the tightness of the reaction vessel is tested by a pressure of 100 atm./g. of $N_2$. The nitrogen is then blown off, and the well locked pressure tube, having an outside diameter of 52 mm., is put into a hinged tube furnace having a cross section of 60 mm. and a length of 750 mm., which can be electrically heated. The reaction vessel is now heated at full heating power. After about 2 hours a temperature of 600° C. is obtained; the resistance control device is then turned back so that a final temperature of from 670° to 680° C. is adjusted, which temperature is maintained for 1 hour and a half of test period. During the test, the maximum pressure in the vessel is 140 atm./g. After this time, the reaction tube is allowed to cool, while the pressure is decreasing to 5–10 atm./g. The pressure of the reaction tube is completely released over a separator cooled to —80° C., one of the valves of the bottom plug is then removed and the content of the tube is emptied into a multi-necked distilling flask which is also cooled. After having added the content of the separator, the low temperature distillation apparatus is completed by mounting a silver-jacket column having a length of 120 cm. and filled with helices, as well as a corresponding column top which can be removed by a magnetic control, by mounting the receiver flasks, the thermometers and other necessary devices. The sump temperature is then slowly raised, the crude mixture is allowed to boil and the separation by distillation is started. The composition of the distillate is controlled by gas chromatography analyses at regular intervals; the different fractions being mixed according to these analyses and their results. Composition of the crude pyrolysis product:

reweighed product: 347 g. (loss: 3 g.)
residue of still wax-like products: 53.5 g.=15.4%
are therefore distilled: 293.5 g.

By a careful distillation at high reflux rate fractions of the substances listed in the following Table in the quantities and percentages as indicated are obtained. In the third column from the right, the retention time of the substances as showing in the GC diagram is indicated.

Constants of the gas chromatograph used:
column: 9 mm. glass tube 6 mm. $\phi$
cell: thermal conductivity cell
solid support: Chromosorb P 30/60
stationary phase: ethylene-glycol - bis - ($\beta$-cyano)-ethyl ether, 15 parts:85 parts of support
cell current: 200 ma.
temperature: 0° C.
carrier gas: helium
recorder: Philips 10 mv. recorder
flow: 36 ml./min. at 0.35 atm./g.
volume fed in: 10 ml.

| Compound | Formula | Boiling point: | Retention time | Quantity (g.) | Percent |
|---|---|---|---|---|---|
| Tetrafluorethylene | $C_2F_4$ | −78 | 4.4 | 6.4 | 2.18 |
| Hexafluoropropene | $C_3F_6$ | −28 | 4.9 | 42.5 | 14.50 |
| Perfluoroisobutylene | iso-$C_4F_8$ | 6.5 | 6.8 | 46.1 | 15.70 |
| Perfluorocyclopentene and perfluoropentene | $C_5F_8$, $C_5F_{10}$ | 21–28 | 7.1/7.6/10.9 | 11.3 | 3.85 |
| Perfluoropentane | $C_5F_{12}$ | ~30 | 5.6 | 25.6 | 8.72 |
| 1-trifluoromethyl-heptafluorocyclopentene-1 | $C_6F_{10}$ | 47–48 | 12.9 | 58.1 | 19.80 |
| Perfluorohexane (mixture) | $C_6F_{14}$ | 57 | 8.2/8.5 | 33.0 | 11.25 |
| Perfluoro-cyclopentenes carrying several long-chain perfluoro-alkyl substituents | $C_7F_{12}$ | ~63 | 11.9 | 11.2 | 3.82 |
| 1-trifluoromethyl-nonafluoro-cyclohexene-1 | $C_7F_{12}$ | 75 | 19 | 15.8 | 5.38 |
| Perfluoroheptene (mixture) | $C_7F_{14}$ | 80 | 20 | 12.5 | 4.26 |
| Perfluoroheptane | $C_7F_{16}$ | 85 | ~17 | 13.1 | 4.46 |
| Perfluoro-cyclohexenes carrying several long-chain perfluoro-alkyl substituents | $C_8F_{14}$ | 90 | ~32 | 6.3 | 2.15 |
| Perfluorooctene | $C_8F_{16}$ | 95 | ~30 | 3.5 | 1.20 |
| Perfluoroctane | $C_8F_{18}$ | 102 | ~23 | 7.5 | 2.56 |
| Total | | | | 292.9 | 99.85 |

By means of gas chromatography, the following substances are furthermore detected: perfluorobutene, perfluoro-cyclobutene, perfluorohexene, perfluorononane etc. The amount of these compounds mostly is less than 1%; the amount of compounds of the $C_nF_{2n-2}$ type in the pyrolysis product is about 33%.

EXAMPLE 2

700 g. of polytetrafluoroethylene in the form of strand- and rod-like scraps of a PTFE processing ram extruder are fed into a high pressure autoclave (capacity 1 litre) made from the high temperature resistant material Tinidur K®. The reaction vessel is closed by a cap, and the tightness of the apparatus is tested by applying a pressure of 100 atm./g. of nitrogen. The pressure of the autoclave is then released again, it is heated to 620°–630° C., and this temperature is maintained for 4 hours and a half in order to affect the polytetrafluorethylene locked in. During the test, a maximum pressure of from 125 to 130 atm./g. is building up in the pyrolysis vessel. After the lapse of the test time, the autoclave is allowed to cool and, as soon as the temperature in the vessel has decreased to 150°–170° C., the pressure in the vessel is released slowly via an exhaust pipe into a separator cooled to —80° C. As soon as no condensation occurs any more in this separator, the compound is separated and work-up of the condensate is started. 24 g. of wax-like residue remains in the autoclave. The condensate from the separator, cooled to a great extent, is then produced the vessel and its content are allowed to cool to 180° C., and all volatile reaction products are then distilled into a separator cooled to —80° C. which has been connected with the vessel. The condensate maintained at —80° C. is subsequently introduced into a well cooled distilling flask which is connected with a low temperature distillation apparatus. The pyrolysis product is then separated to obtain its components by distillation via an active column at high reflux rate. The composition of the distillate is regularly controlled by means of gas chromatography analyses.

reweighed product: 296 g. (loss: 4 g.)
residue of still wax-like products: 19.8 g.=6.2%
are therefore distilled: 296 g.

COMPOSITION OF THE CRUDE PYROLYSIS PRODUCT

| Compound | Formula | Boiling point: | Retention time | Quantity (g.) | Percent |
|---|---|---|---|---|---|
| Tetrafluorethylene | $C_2F_4$ | ~78 | 4.4 | 6.30 | 2.10 |
| Hexafluoropropylene | $C_3F_6$ | ~28 | 4.9 | 17.00 | 5.70 |
| Perfluorocyclobutene | $C_4F_6$ | +1.13 | 6.1 | 14.00 | 4.57 |
| Perfluoro-isobutylene | iso-$C_4F_8$ | 6.5 | 6.8 | 32.70 | 10.74 |
| Perfluoro-cyclopentene and perfluoropenten | $C_5F_8$, $C_5F_{10}$ | 21–28 | 7.1/7.6/10.9 | 8.70 | 2.94 |
| Perfluoropentane | $C_5F_{12}$ | 30 | 5.6 | 30.20 | 10.13 |
| 1-trifluoromethyl-heptafluoro-cyclopentene-1 | $C_6F_{10}$ | 47–48 | 12.9 | 37.00 | 12.42 |
| Perfluorohexane (mixture) | $C_6F_{14}$ | 57 | 8.2, 8.5 | 57.60 | 19.34 |
| Perfluoro-cyclopentenes carrying several long-chain perfluoro-alkyl substituents | $C_7F_{12}$ | ~63 | 11.9 | 11.00 | 3.70 |
| 1-trifluoromethyl-nonafluoro-cyclohexene-1 | $C_7F_{12}$ | 75 | ~19 | 15.50 | 5.20 |
| Perfluoroheptene | $C_7F_{14}$ | ~80 | ~20 | 4.40 | 1.47 |
| Perfluoroheptane | $C_7F_{16}$ | 85 | 17 | 28.00 | 9.40 |
| Perfluoro-cyclohexenes carrying several long-chain perfluoro-alkyl substituents | $C_8F_{14}$ | 90 | ~32 | 21.80 | 7.32 |
| Perfluoroctene | $C_8F_{16}$ | 95 | 30 | 6.50 | 2.18 |
| Perfluoroctane | $C_8F_{18}$ | 102 | 23 | 2.18 | 0.73 |
| Total | | | | 292.88 | 97.94 | into a well cooled distilling flask and subsequently separated in analogy to the indications given in Example 1 by means of distillation via a silver-jacket column of a length of 120 cm.

Composition of the crude pyrolysis product:
reweighed product: 691 g. (loss: 9 g.)
residue of wax-like products: 24 g.=3.4%
are therefore distilled: 667 g.

The following table shows the composition of the crude pyrolysis product and the proportion of the components.

Furthermore, the following substances are present in insignificant amounts which can be detected by gas chromatography but cannot be separated by distillation: perfluorobutene, perfluoro-cyclobutene, perfluorohexene, perfluorononane and other non identifiable peaks.

The amount of cyclic olefins of the formula $C_nF_{2n-2}$ in the pyrolysis product in this example is above 35%.

EXAMPLE 4

700 g. of a fluorocarbon wax, melting point above

| Compound | Formula | Boiling point: | Retention time | Quantity (g.) | Percent |
|---|---|---|---|---|---|
| Tetrafluorethylene | $C_2F_4$ | —78 | 4.4 | 5.85 | 0.88 |
| Hexafluoropropene | $C_3F_6$ | —28 | 4.9 | 122.50 | 18.30 |
| Perfluoroisobutylene | iso-$C_4F_8$ | 6.5 | 6.8 | 131.59 | 19.70 |
| Perfluorocyclopentene and perfluoropentene | $C_5F_8$, $C_5F_{10}$ | 21–28 | 7.1/7.6/10.9 | 7.80 | 1.20 |
| Perfluoropentane | $C_5F_{12}$ | ~30 | 5.6 | 59.80 | 9.00 |
| 1-trifluoromethyl-heptafluorocyclopentene-1 | $C_6F_{10}$ | 47–48 | 12.9 | 120.00 | 18.00 |
| Perfluorohexane (mixture) | $C_6F_{14}$ | 57 | 8.2, 8.5 | 86.00 | 12.80 |
| Perfluoro-cyclopentenes carrying several long-chain perfluoro-alkyl sustituents | $C_7F_{12}$ | 63 | 11.9 | 27.00 | 4.05 |
| 1-trifluoromethylnonafluoro-cyclohexene-1 | $C_7F_{12}$ | 75 | 19 | 30.00 | 4.50 |
| Perfluoroheptene | $C_7F_{14}$ | 80 | 20 | 26.30 | 3.90 |
| Perfluoroheptane | $C_7F_{16}$ | 85 | 17 | 33.70 | 5.05 |
| Perfluoro-cyclohexenes carrying several long-chain perfluoro-alkyl substituents | $C_8F_{14}$ | ~90 | ~32 | 6.00 | 0.90 |
| Perfluoroctene | $C_8F_{16}$ | 95 | ~30 | | <1 |
| Perfluoroctane | $C_8F_{18}$ | 102 | ~23 | 11.20 | 1.70 |
| Total | | | | 667.65 | 99.98 |

The perfluoro-cyclo-olefins are present in the pyrolysis product in an amount of 28.15%.

EXAMPLE 3

320 g. of a tetrafluorethylene/hexafluoropropene copolymer (FEP) in the form of rolled-up cut-off of a sheet manufacturing plant are introduced into the pressure tube made from V 4A steel, having a capacity of 600 cm.³ as described in Example 1. The ends of the tube are closed by means of the plugs bearing the valves and manometers, and the filled and tightened pressure vessel is put into the heating zone of a suitable tube furnace. The pressure pipe is flushed with nitrogen for a short time, and its tightness is controlled at 120 atm./g. The vessel and its content are then rapidly heated to 590–600° C., and this temperature is subsequently maintained for a further 6 hours and a half. A pressure of 120–130 atm./g. is adjusting in the pyrolysis vessel during this time. After the reaction time has passed, the heating device is switched off, the furnace, 300° C., taken from a spoiled production batch, are introduced into the high pressure autoclave made from Tinidur K®, capacity 1 litre, as described in Example 2. The vessel is closed, screwed and tightened. The air is driven out of the reaction vessel by pressing in $N_2$, and finally a foreign gas pressure of 17 atm./g. of $N_2$ is maintained on the reaction vessel. The heating device is switched on, and the automatic test control is programmed to a defined temperature of 640° C. and to a test time of 2 hours and a half. During the pyrolysis, a pressure of 165–170 atm./g. is building up in the reaction vessel. After the program has come to an end, the autoclave is allowed to cool to about 180° C. The exhaust pipe leading into the open air over the roof via a separator cooled to —80° C. is then opened, so that all volatile reaction products may escape or condensate in the cooled separator. Subsequently, the crude condensate is worked up in the manner described in the preceding examples.

reweighed product: 687 g. (loss: 13 g.) residue of wax-like products: 18 g.=2.6% are therefore distilled: 669 g.

| Compound | Formula | Boiling point: | Retention time | Quantity (g.) | Percent |
|---|---|---|---|---|---|
| Hexafluoropropene | $C_3F_6$ | −28 | 4.9 | 117.0 | 17.50 |
| Perfluoro-isobutylene | iso-$C_4F_8$ | 6.5 | 6.8 | 143.5 | 21.50 |
| Perfluoro-cyclopentene and perfluoropentene | $C_5F_8$, $C_5F_{10}$ | 21–28 | 7.1/7.6/10.9 | 22.5 | 3.35 |
| Perfluoropentane | $C_5F_{12}$ | 30 | 5.6 | 54.0 | 8.00 |
| 1-trifluoromethyl-heptafluoro-cyclopentene-1 | $C_6F_{10}$ | 47–48 | 12.9 | 154.0 | 23.60 |
| Perfluorohexane | $C_6F_{14}$ | 57 | 8.2/8.5 | 56.4 | 8.40 |
| Perfluoro-cyclopentenes carrying several long-chain perfluoro-alkyl substituents | $C_7F_{12}$ | 63–67 | 11.9 | 30.5 | 4.60 |
| 1-trifluoromethyl-nonafluoro-cyclohexene-1 | $C_7F_{12}$ | ~75 | 19 | 28.0 | 4.20 |
| Perfluoroheptene | $C_7F_{14}$ | ~80 | ~20 | 22.5 | 3.35 |
| Perfluoroheptane | $C_7F_{16}$ | 85 | 17 | 25.3 | 3.78 |
| Perfluorooctane | $C_8F_{18}$ | 102 | 23 | 9.2 | 1.38 |
| Total | | | | 663.0 | 99.1 |

The following substances are also present in small amounts: perfluoroctene, perfluoro-cyclobutene, perfluorohexene, perfluoro-cyclohexene and tetrafluorethylene (0.45%).

In the total pyrolysis product, the cyclic perfluoro-olefins amount to 35%; pure 1-trifluoromethyl-heptafluoro-cyclopentene-1 alone amounting to 23%.

EXAMPLE 5

This example gives evidence for the activity of the catalysts proposed according to the present invention, which catalysts enhance favourably the formation of low molecular weight degradation products. In two parallel tests, 350 g. each of polytetrafluorethylene (scrap pieces of ram extruded rods having a diameter of 10 mm.) are introduced into the pressure tube as described in Example 1, and exposed for 3 hours and a half to a temperature of 595 to 600° C., in one case without any addition (test A), in the other with addition of 1% (=3.5 g.) of potassium nitrate (test B). A considerable difference shows above all in the depolymerisation degree as well as in the composition of the crude pyrolysis product.

The following table shows the compared results:

| Test | Time (hrs.) | Temperature (° C.) | Additives ($KNO_3$) | Pressure (atm./g.) | Amount weighed (g.) | Loss Grams | Loss Percent | Residue wax Grams | Residue wax Percent | Crude pyrolysis product Grams | Crude pyrolysis product Percent |
|---|---|---|---|---|---|---|---|---|---|---|---|
| A | 3½ | 595–600 | | 105 | 350 | 7 | 2 | 76 | 22 | 267 | 76 |
| B | 3½ | 595–600 | 3.5 | 123 | 350 | 9 | 2.6 | 13 | 3.7 | 328 | 94 |

COMPOSITION (IN PERCENT OF THE STARTING MATERIAL)

| | Test A | Test B |
|---|---|---|
| Tetrafluorethylene | 1.4 | 2.3 |
| Hexafluoropropene | 17 | 11.5 |
| Perfluoro-cyclobutene | 0.75 | 1.65 |
| Perfluoro-isobutylene | 15.7 | 15.2 |
| Perfluoro-cyclopentene perfluoro-pentene | 1.5 | 2.5 |
| Perfluoropentane | 5.4 | 9.9 |
| 1-trifluoromethyl-heptafluorocyclopentene | 13.2 | 15.4 |
| Perfluorohexane | 7.6 | 15.6 |
| Perfluoro-cyclopentenes carrying several long-chain perfluoroalkyl substitutents | 5.2 | 3.15 |
| 1-trifluoromethyl-nonafluoro-cyclohexene | 0.8 | 3.7 |
| Perfluoroheptene | 3.6 | 1.86 |
| Perfluoroheptane | 2.8 | 5.4 |
| Perfluoro-cyclohexenes carrying several long-chain perfluoroalkyl substituents | | 4.9 |
| Perfluoroctene | 1 | |
| Perfluoroctane | | 0.63 |

In test A, 73 to 75 g. of cyclic perfluorated olefins, in test B, however, 105 to 107 g. are obtained. Furthermore, the rate of five- to seven-membered perfluoro-alkanes has considerably increased (partially up to 100%) in the test carried out with addition of the catalyst, while the depolymerisation degree in this latter test, at the same temperature and after the same time, is by far superior to that of the first test.

I claim:

1. Process for the preparation of liquid or gaseous cyclic perfluoro-olefins having a 4 to 6-member ring and the perfluoro-alkyl substituted derivatives thereof corresponding to the formula $$C_nF_{2n-2},$$

in which $n$ represents an integer of from 4 to 12, by thermic cracking of perfluorocarbon compounds and fluorocarbon waxes of from 500 to about 6 million molecular weight, at elevated temperatures and under increased pressure, wherein the pyrolysis is carried out at temperatures of from 500° to 1000° C. and under partial pressures of the degradation products of from 50 to 300 atm./g., and the reaction products so obtained are subsequently separated by distillation.

2. Process as claimed in claim 1, wherein the temperature of the pyrolysis is between 600° and 700° C.

3. Process as claimed in claim 1, wherein, during the pyrolysis, partial pressures of the degradation products of from 70 to 200 atm./g. are maintained.

4. Process as claimed in claim 1, wherein the pyrolysis is carried out in the presence of a nitric oxide or mixture thereof, a nitrosyl, thionyl, sulfuryl or nitroso compound as catalyst.

5. Process as claim in claim 1, wherein, as catalysts, substances of the series of nitric oxides, sulfur oxides, thionyl, sulfuryl, nitrosyl and nitroso compounds or compounds setting free the above cited substances in the pyrolysis are added before the pyrolysis is started in amounts of from 0.01 to 5 percent by weight.

6. Process as claimed in claim 1, wherein the pyrolysis is carried out in the presence of inert gases.

7. Process as claimed in claim 1, wherein, before the start of the pyrolysis, a definite pressure is predetermined by means of an inert foreign gas from the series of nitrogen or argon, or a gase similar in nature from the group of tetrafluorethylene, tetrafluoro-ethane, tetrafluoromethane.

8. Liquid or gaseous unsubstituted or perfluoro-alkyl-substituted cyclic perfluoro-olefins having a 4 to 6-member ring and corresponding to the formula $C_nF_{2n-2}$, in which $n$ represents an integer of from 4 to 12, prepared by pyrolysis of perfluorocarbon compounds and fluorocarbon waxes of from 500 to about 6 million molecular weight at temperatures of from 500° to 1000° C. and at partial pressures of the degradation products of from 50 to 300 atm./g., and by subsequent separation of the pyrolysis products by distillation.

9. Cyclic perfluoro-olefins as claimed in claim 8, prepared at temperatures of from 600° to 700° C.

10. Cyclic perfluoro-olefins as claimed in claim 8, prepared in the presence of a nitric oxide or mixture thereof, a nitrosyl, thionyl, sulfuryl or nitroso compound as catalyst.

11. Cyclic perfluoro-olefins as claimed in claim 8, prepared in the presence of inert gases.

(References on following page)

References Cited

UNITED STATES PATENTS

| | | | |
|---|---|---|---|
| 2,394,581 | 2/1946 | Benning et al. | 260—648 F |
| 2,480,560 | 8/1949 | Downing et al. | 260—648 F |
| 2,664,449 | 12/1953 | Miller | 260—648 F |
| 2,933,536 | 4/1960 | Wall et al. | 260—653.1 |

DANIEL D. HORWITZ, Primary Examiner

U.S. Cl. X.R.

260—653.1 T